United States Patent [19]

Paschke et al.

[11] 4,358,562

[45] Nov. 9, 1982

[54] COPOLYIMIDES FROM TETRAMETHYLCYCLOBUTANE-1,2,3,4-TETRACARBOXYLIC DIANHYDRIDE AND A MIXTURE OF DIAMINES

[75] Inventors: Edward E. Paschke; Tayseer S. Nimry, both of Wheaton; Ellis K. Fields, River Forest, all of Ill.

[73] Assignee: Standard Oil Company (Indiana), Chicago, Ill.

[21] Appl. No.: 286,694

[22] Filed: Jul. 24, 1981

[51] Int. Cl.³ ............................................. C08G 73/10
[52] U.S. Cl. ................................... 524/600; 524/494; 528/125; 528/128; 528/188; 528/189; 528/206; 528/208; 528/220; 528/229; 528/352; 528/353
[58] Field of Search ................. 528/229, 20, 188, 189, 528/352, 353, 125, 128, 206, 208; 260/37 N; 524/494, 600

[56] References Cited

U.S. PATENT DOCUMENTS 2,489,725  1/1970  Lucas .................................... 528/353
3,073,784  1/1963  Endrey ................................. 528/353

FOREIGN PATENT DOCUMENTS 2519671 11/1975 Fed. Rep. of Germany ...... 528/353

OTHER PUBLICATIONS

Nakanishi et al., *Polymers*, 14, 440 (1973).

*Primary Examiner*—Lester L. Lee
*Attorney, Agent, or Firm*—Gunar J. Blumberg; William T. McClain; William H. Magidson

[57] ABSTRACT

Novel copolyimides and molding compositions are prepared from tetramethylcyclobutane-1,2,3,4-tetracarboxylic dianhydride and mixtures of diamines. Also glass and graphite filled polyimides are prepared. The polyimides are useful as engineering plastics.

31 Claims, No Drawings

COPOLYIMIDES FROM TETRAMETHYLCYCLOBUTANE-1,2,3,4-TETRACARBOXYLIC DIANHYDRIDE AND A MIXTURE OF DIAMINES

BACKGROUND OF THE INVENTION

1. Field of the Invention

The field of this invention relates to copolyimides prepared from tetramethylcyclobutane-1,2,3,4-tetracarboxylic dianhydride (TMCDA) and a mixture of diamines. These novel copolyimides are useful in preparing molded articles, fibers, films, laminates and coatings.

2. Background

It is known to make copolyimides from pyromellitic dianhydride and aromatic diamines. This is disclosed in U.S. Pat. No. 3,179,634 (1965). British Patent Specification No. 570,858 discloses various processes for making fiber forming polymers. The Japanese Patents listed below disclose the preparation of polyimides starting with cyclobutane-1,2,3,4-tetracarboxylic dianhydride.

JA 7123917-S27, JA 7137733-S44, JA 7137734-S44JA 7219710-T23, and JA 72199098-T23. The article by F. Nakanishi and M. Hasegawa, Polymers, 14, 440 (1973) discloses the use of cyclobutane-1,2,3,4-tetracarboxylic dianhydride and 1,3-dimethylcyclobutane-1,2,3,4-tetracarboxylic dianhydride in the preparation of polyimides. In reviewing all these references, it is clear that the use of TMCDA to form copolyimides useful as moldings, films, fibers, laminates, and coatings has not been contemplated in the prior art. Copending applications U.S. Ser. Nos. 286,696, 286,697, and 294,345 all filed 724-81 disclose homopolyimides of TMCDA and a diamine and copolyimides of TMCDA and a second dianhydride with a diamine and glass reinforced polyimides and copolyimides. All these companion applications are incorporated herein by reference.

The general object of this invention is to provide novel copolyimides based on TMCDA and a mixture of diamine moieties. A more specific object of this invention is to provide copolyimides from TMCDA moieties and mixtures of aliphatic, cycloaliphatic, araliphatic and aromatic moieties. Another object is to provide a process for the manufacture of copolyimides, from TMCDA and a mixture of diamines.

We have found that novel copolyimides can be formed by reacting TMCDA with a mixture of diamines. TMCDA reacts readily with the diamine mixture to form a high molecular weight copolyimide. In the novel process both aliphatic and aromatic diamines can be copolymerized with TMCDA in the melt to form high molecular weight copolyimides.

Our process for the manufacture of the novel polyimides comprises reacting about equal molar amounts of TMCDA with or a mixture of primary diamines. The molecular ratio of TMCDA to the mixture of primary diamines may be in the range of 1.3:1.0 to 1.0:1.3 preferably in the range of 1.00 to 1.00. In a suitable method, the reaction is conducted as a batch reaction at a temperature of about 130° to 300° C. for a period of about 0.25 to 6.0 hours in a nitrogen containing organic polar solvent such as 1-methyl-2 pyrrolidinone (NMP), N,N-dimethylacetamide or pyridine. The polycondensation can also be carried out as a continuous process. The polycondensation can suitably be carried out at a temperature of 0° C. to 200° C., preferably at a temperature of 50° to 100° C.

The novel copolyimides of this invention have the following recurring structure:

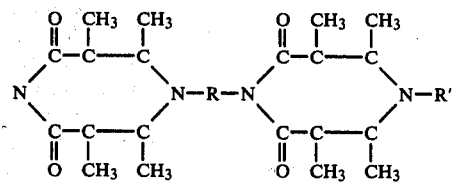

wherein R is a divalent aliphatic or aromatic hydrocarbon radical. The radicals R and R' are different and may be divalent aliphatic hydrocarbons of 2 to 18 carbon atoms or an aromatic hydrocarbon from 6 to 20 carbon atoms, or an aromatic hydrocarbon radical containing from 6 to 10 carbon atoms joined directly or by stable linkage comprising —O—, methylene,

—SO—, —SO$_2$—, and —S—radicals. The radicals R and R' are derived from aliphatic, araliphatic or cycloaliphatic diamines such as ethylenediamine, propylenediamine, 2,2-dimethylpropylene diamine, tetramethylene diamine, hexamethylene diamine, octamethylene diamine, nonamethylene diamine, decamethylene diamine, dodecamethylene diamine, 4,4'-diaminodicyclohexylethane, xylylene diamine and bis-(aminomethyl)cyclohexane. Suitable aromatic diamines useful in our process include para- and meta-phenylenediamine, 4,4'-oxydianiline, thiobis (aniline), sulfonylbus (aniline), diaminobenzophenone, methyleneis (aniline), benzidine, 1,5-diaminonaphthalene, oxybis (2-methylaniline), thiobis (2-methylaniline), and the like. Examples of other useful aromatic primary diamines are set out in U.S. Pat. No. 3,494,890(1970) and U.S. Pat. No. 4,016,140 (1972) both incorporated herein by reference. The preferred diamine mixtures are 1,6-hexamethylenediamine and 1,12-dodecanediamine, 1,6-hexamethylenediamine and 4,4'-oxydianiline, 1,12-dodecanediamine and 4,4'-oxydianiline and 1,6-hexamethylenediamine and ethylene diamine. The ratio of the two diamines may be in the range of 19:1 to 1:19 preferably 3:1 to 1:3.

In some cases the copolyimide may be further polymerized under "solid state polymerization" conditions. The term solid state polymerization refers to chain extensions of polymer particles under conditions where the polymer particles retain their solid form and do not become a fluid mass. The solid state polymerization can be carried out below the melting point of the copolyimide and can be conducted in several ways. However all techniques require heating the ground or pelletized polyimide below the melting point of the polyimide, generally at a temperature of about 200° to 300° C. while either sparging with an inert gas such as nitrogen or operating under vacuum. In cases where the copolyimides have a low melt temperature, they can be polymerized in the melt under vacuum in thin sections or using thin film reactors known in the art.

Injection molding of the novel copolyimide is accompanied by injecting the polyimide into a mold maintained at a temperature of about 23° to 200° C. In this process a 20 second to 1 minute cycle is used with a barrel temperature of about 200° C. to 350° C. The latter will vary depending on the $T_g$ and $T_m$ of the polymer being molded.

The novel polyimides have excellent mechanical and thermal properties and can readily be molded into useful articles or formed into fibers, films, laminates or coatings. Infrared spectra of the polyimides has confirmed the copolyimide structure and also shows the absence of any amide structure in the copolyimides. Carbonyl band heights are also consistent with the groups in the polyimide structure.

Analysis of the TMCDA-diamine copolyimide by thermal gravimetric analysis shows excellent stability. This is demonstrated by the fact that under nitrogen atmosphere the 1 percent weight loss occurs at a temperature of 310° C. and main weight loss occurs at a temperature of about 390° C. Glass transition temperature $T_g$ of the polyimide varied with the particular diamine used as shown in the Examples.

Diamines with the amino groups attached directly to the aromatic ring are suitably copolymerized with TMCDA by solution condensation in organic polar solvents. Useful polar solvents include N,N-dimethylacetamide, 1-methyl-2-pyrrolidinone, N,N-dimethylformamide, dimethylsulfoxide and the like.

The copolyimide was cast into films. The films were heated at a temperature of 200° C. for 10 minutes. The dry film was 10 mm in thickness and was transparent.

We have found that the copolyimides of this invention are improved by the addition of refinforcing material particularly the mechanical properties of the polyimides are improved if these copolyimides contain from about 25 to 60 percent by weight glass fibers, glass beads, industrial minerals such as talc or graphite or mixtures thereof. In the preferred range the polyimides contain 30 to 40 percent by weight of the glass fibers, glass beads, industrial minerals or graphite or mixtures thereof. Suitably reinforcing materials can be glass fibers, glass beads, glass spheres, glass fabrics. The glass fibers are made of alkali-free boron-silicate glass or alkali containing C-glass. The thickness of the fiber is suitably on the average between 3 and 30 mm. It is possible to use both long fiber with average lengths of from 5 to 50 mm and also short fibers with an average filament length from 0.05 to 5 mm. In principle, any standard commercial-grade fibers especially glass fibers may be used. Glass beads ranging from 5 to 50 mm in diameter may also be used as a reinforcing material.

The reinforced copolyimide polymers may be prepared in various ways. For example, so-called rovings endless glass fiber strands are coated with the polyamic acid melt and subsequently granulated. The cut fibers or the glass beads may also be mixed with granulated polyamic acid and the resulting mixture melted in a conventional extruder, or alternatively the fibers may be directly, introduced into the polyamic acid melt through a suitable inlet in the extruder. Injection molding of the novel glass-filled polyimide is accomplished by injecting the polyimide into a mold maintained at a temperature of about 23° to 200° C. In this process a 25 to 28 second cycle is used with a barrel temperature of about 200° to 350° C. The injection molding conditions are given in Table 1.

TABLE I

| Mold Temperature | 23 to 200° C. |
| Injection Pressure | 15,000 to 19,000 psi and held for 1 to 3 seconds |
| Back Pressure | 100 to 220 psi |
| Cycle Time | 25 to 28 seconds |

TABLE I-continued

| Extruder: | |
| Nozzle Temperature | 200 to 350° C. |
| Barrels: | |
| Front heated to | 200 to 350° C. |
| Screw: | |
| 20 to 25 revolutions/minute | |

The following examples illustrate the preferred embodiment of the invention. It will be understood that the examples are for illustrative purposes only and do not purport to be wholly definitive with respect to conditions or scope of the invention.

EXAMPLE 1

The dianhydride, TMCDA, was prepared from maleic anhydride according to literature procedures. Treatment of maleic anhydride in boiling acetic acid and in the presence of 2-aminopyridine gives with decarboxylation 2,3-dimethylmaleic anhydride (M. E. Baumann and H. Bosshard, *Helv. Chim. Acta, 16, 2751* (1978). This compound is then converted to its dimer by irradiating its benzene solution sensitized by benzophenone with ultraviolet light for several hours (G. D. Schenk, W. Hartmann, S. P. Mansfeld, W. Metzner, and C. H. Krauch, *Chem. Ber., 95, 1642* (1962). The resulting photodimer was recrystallized from acetic anhydride. The literature procedure was improved by using a weak UV source through Pyrex.

EXAMPLE 2

TMCDA was vacuum dried prior to use. 1,6-hexamethylenediamine (HMDA) and 1,12-dodecanediamine (DDA) were purified by distillation. NMP was made anhydrous by distilling from a phosphorous pentoxide containing slurry.

A mixture of 2.00 g (0.010 mole) of DDA, 3.49 g (0.030 mole) of HMDA, 10.0 g (0.040 mole) of TMCDA, 130 ml of NMP, and 20 ml of p-xylene was placed in a three-neck flask equipped with a stirrer, nitrogen sweep, and a Dean-Stark trap fitted with a condenser and drying tube. The reactants were refluxed for 3.5 hours, and the solution was then cooled. The copolyimide was precipitated by adding the solution to water in a Waring blener. The product was filtered, and dried in a vacuum oven at 200° C. and 1 mm Hg for an hour. The copolyimide weighed 13.2 g (93% of theory) and had a 0.77 dl/g inherent viscosity measured in 60/40 phenol/tetrachloroethane by weight at 30° C. and a concentration of 0.4000 g/dl. Differential thermal analysis showed a glass transition temperature of 96° C. and a crystalline melting temperature of 303° C. Films were melt compression molded at 320° C.

EXAMPLE 3

The procedure of Example 2 was repeated except the mixture consisted of 25.22 g (0.100 mole) of TMCDA, 8.70 g (0.075 mole) of HMDA, 1.58 g (0.025 mole) of ethylenediamine, 325 ml of NMP, and 50 ml of benzene. Copolyimide weight was 31.1 g (97% of theory) and had a 0.61 dl/g inherent viscosity. The glass transition temperature was 165° C.

The copolyimide was injection molded to form test specimens. The ultimate tensile strength was 7,300 psi and the parts exhibited good stiffness.

EXAMPLE 4

TMCDA and 4,4'-oxydianiline (ODA) were vacuum sublimed prior to use; other materials were purified as described in Example 2.

To a three-neck flask was added 5.01 g (0.025 mole) of ODA, 5.01 g of DDA, and 125 ml of NMP. The flask was equipped with a nitrogen sweep, stirrer, and distillation head. The mixture was slightly warmed to obtain solution and then cooled to room temperature. To the solution was added 12.61 g (0.050 mole) of TMCDA and 79 ml of NMP. The mixture was stirred at room temperature for two hours at which time complete solution was obtained. The flask was submerged into an oil bath at 200° C. for 1.5 hours during which time water and NMP were removed. The solution was cooled and added to water in a Waring blender. The product was filtered and dried in a vacuum oven at 200° C. and 1 mm Hg for an hour. The copolyimide weighed 19.5 g (93% of theory) and had a 0.42 dl/g inherent viscosity. Transparent, amorphous films were melt fabricated at 250° C. from the copolyimide.

EXAMPLE 5

The procedure of Example 4 was repeated except that 2.91 g (0.025 mole) of HMDA replaced the DDA. The product weighted 16.4 g (88% of theory) and had a 0.46 dl/g inherent viscosity. Melt fabrication gave a transparent film.

We claim:

1. A copolyimide of the following recurring structure

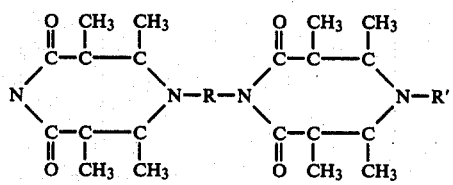

wherein R and R' are different divalent aliphatic or aromatic hydrocarbon radicals.

2. The copolymer of claim 1 wherein R and R' are different aliphatic hydrocarbons from 2 to 18 carbon atoms.

3. The copolyimide of claim 1 wherein R and R' are different aromatic hydrocarbons from 6 to 20 carbon atoms.

4. The copolyimide of claim 1 wherein the aromatic hydrocarbon radicals contain from 6 to 10 carbon atoms joined directly or by stable linkage selected from the group consisting of —O—, methylene,

—SO—, SO₂— and —S—radicals.

5. The copolyimides of claim 1 wherein the copolyimide is in the form of a molded object.

6. A copolyimide molding composition comprising the copolyimide of claim 1 wherein the molding composition contains from about 30 to 50 weight percent of either glass fibers, glass beads, or graphite or a mixture thereof.

7. The copolyimide of claim 1 wherein the polyimide is in the form of a laminate.

8. The copolyimide of claim 1 wherein the polyimide is in the form of a fiber.

9. The copolyimide of claim 1 wherein the polyimide is in the form of a film.

10. The copolyimide of claim 1 wherein the copolyimide is in the form of a metal coating suitable for electrical service.

11. A copolyimide of claim 1 wherein R is —(CH$_2$)$_6$— and R' is —(CH$_2$)$_{12}$—.

12. A copolyimide of claim 11 wherein the polyimide is in the form of a molded object.

13. A copolyimide molding composition comprising the polyimide of claim 11 where the molding composition contains from about 30 to 50 weight percent of either glass fibers, glass beads, or graphite or a mixture thereof.

14. The copolyimide of claim 11 wherein the polyimide is in the form of a laminate.

15. The copolyimide of claim 11 wherein the polyimide is in the form of a fiber.

16. The copolyimide of claim 11 wherein the polyimide is in the form of a film.

17. A copolyimide of claim 1 wherein R is —(CH$_2$)$_6$— and R' is —(CH$_2$)$_2$—.

18. A copolyimide of claim 17 wherein the polyimide is in the form of a molded object.

19. The copolyimide of claim 17 wherein the polyimide is in the form of a laminate.

20. The copolyimide of claim 17 wherein the polyimide is in the form of a fiber.

21. The copolyimide of claim 17 wherein the polyimide is in the form of a film.

22. A copolyimide of claim 1 wherein R is

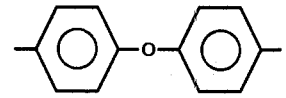

and R' is —(CH$_2$)$_{12}$—.

23. The copolyimide of claim 22 wherein the copolyimide is in the form of a molded object.

24. The copolyimide of claim 22 wherein the copolyimide is in the form of a laminate.

25. The copolyimide of claim 22 wherein the copolyimide is in the form of a fiber.

26. The copolyimide of claim 22 wherein the copolyimide is in the form of a film.

27. The copolyimide of claim 1 wherein R is

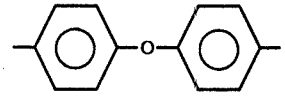

and R' is —(CH$_2$)$_6$—.

28. The copolyimide of claim 27 wherein the copolyimide is in the form of a molded object.

29. The copolyimide of claim 27 wherein the copolyimide is in the form of a laminate.

30. The copolyimide of claim 27 wherein the copolyimide is in the form of a fiber.

31. The copolyimide of claim 27 wherein the copolyimide is in the form of a film.

* * * * *

UNITED STATES PATENT OFFICE
CERTIFICATE OF CORRECTION

Patent No. 4,358,562      Dated November 9, 1982

Inventor(s) Edward E. Paschke, Tayseer S. Nimry, Ellis K. Fields

It is certified that error appears in the above-identified patent and that said Letters Patent are hereby corrected as shown below:

| Patent Column | Line | |
|---|---|---|
| 1 | 23 | "S44JA" should read -- S44, JA --. |
| 1 | 25 | "14" should read --$\underline{14}$-- |
| 2 | 35 | "sulfonylbus" should read --sulfonylbis-- |
| 2 | 35-36 | "methyleneis" should read --methylenebis-- |
| 3 | 29 | "refinforcing" should read --reinforcing-- |
| 4 | 47 | "blener" should read --blender-- |
| 5 | 28 | "weighted" should read --weighed-- |

Signed and Sealed this

Twenty-second Day of November 1983

[SEAL]

Attest:

GERALD J. MOSSINGHOFF

Attesting Officer     Commissioner of Patents and Trademarks